United States Patent [19]

Staples, Jr.

[11] 4,018,639

[45] Apr. 19, 1977

[54] METHOD OF ASSEMBLING A COMPOSITE PRINT WHEEL

[75] Inventor: Ernest L. Staples, Jr., Dallas, Tex.

[73] Assignee: Xerox Corporation, Stamford, Conn.

[22] Filed: Oct. 15, 1975

[21] Appl. No.: 622,565

[52] U.S. Cl. .............................. 156/73.1; 156/245; 29/418; 197/53; 264/23; 264/241; 264/328

[51] Int. Cl.$^2$ .......................................... B32S 3/20

[58] Field of Search ........... 197/53, 54, 64; 178/17, 178/25; 156/73.1, 245; 29/418; 264/241, 23, 328

[56] References Cited

UNITED STATES PATENTS

| | | | |
|---|---|---|---|
| 3,298,493 | 1/1967 | Brers | 197/36 |
| 3,651,916 | 3/1972 | Becchi | 197/54 |
| 3,805,941 | 4/1974 | Cattaneo | 197/53 |
| 3,848,722 | 11/1974 | Bolan et al. | 197/53 |
| 3,921,277 | 11/1975 | Tramposch | 156/73.1 |

*Primary Examiner*—Edward G. Whitby

[57] ABSTRACT

A method of assembling a composite print wheel comprising the steps of locating a hub member in an assembly fixture in a fixed predetermined position; locating an insert member, with character slugs attached, in the assembly fixture such that the print characters on the character slugs align with and fit into a respective molded likeness of a corresponding print character provided in the assembly fixture and then fastening the hub member and the insert member together.

6 Claims, 10 Drawing Figures

METHOD OF ASSEMBLING A COMPOSITE PRINT WHEEL

BACKGROUND OF THE INVENTION

This invention relates in general to print wheels and more particularly to a method of assembling a print wheel comprised of a plurality of individual piece parts.

Printing elements for serial printers shaped generally in the form of a wheel or the like have been known for some time. By way of example, see U.S. Pat. Nos. 2,236,663, 3,461,235, 3,498,439, 3,651,916, 3,859,712 and 3,884,340.

If the print wheel is to be used in a high-speed serial printer requiring rapid bidirectional rotation, it is preferred that the print wheel be light in weight. It is also preferred that the beams or arms of the print wheel be flexible.

Diablo Corporation, a subsidiary of the present assignee, has marketed a serial printer under the trade name Diablo Hytype I, which has a print wheel having a plurality of character slugs located at the ends of spokes or beams extending radially outwardly from a control hub. The print wheel is rotated by a servo mechanism to position selected characters opposite a print hammer and ribbon at a printing station location. The Hytype I printer has enjoyed commercial success as an electronic serial printer capable of high speed and versatile operation. The print wheel, which the Hytype I printer employs, is basically a single element structure in that the central hub, beams and slugs are an integrally molded thermoplastic structure fabricated in accordance with injection molding techniques. This print wheel gives excellent performance with very favorable economics, i.e., the integral wheel is relatively inexpensive to manufacture. Nonetheless, when subjective standards of print quality are encountered in certain applications, the integral structure print wheel does not always give the desired print quality.

Specifically, in automatic text-editing typewriter or office-typing environment, the demands upon a print wheel are great; the demands for high print quality cause the print wheel to be subjected to about ten times greater force because of about five times greater hammer energy compared to a Hytype I printer operating as a computer output terminal, for example. The present assignee is marketing an automatic text-editing typing system for application in the office environment under the trade name of Xerox 800 Electronic Typing System, which employs the printing mechanism of the Diablo Hytype I but with the inclusion of various modifications. One of the modifications made to upgrade the print quality was the provision of a composite-type print wheel, such as that disclosed in U.S. patent application, Ser. No. 509,193, filed Sept. 25, 1974, in the name of Gordon Sohl et al., titled "Composite Print Wheel", the disclosure of which is incorporated by reference into this specification.

A plastic, integral print wheel performs satisfactorily in both the high speed and energy modes mentioned above but not with the same print or image quality over the same life span. Loss in image quality is generally judged as the first fall off in image resolution detectable by the unaided eye. The composite wheel, on the other hand, performs excellently over a very broad range of operating conditions.

While the plastic, single element print wheel is fabricated as an integral molded thermoplastic structure using injection molding techniques, the plurality of individual piece parts of the composite print wheel must be assembled together as a functional unit. The individual piece parts must be assembled with a relatively great degree of accuracy in order to maintain the horizontal and vertical registration alignment of the various print characters, located on the plurality of character slugs, with respect to the center about which the print wheel rotates. The conventional manner of controlling the tolerances of the mating individual parts did not result in an assembled print wheel, which would meet the required specification and tolerance, relative to vertical and horizontal placement or location of the print characters with respect to the center of the hub, of print quality required in the office typing environment.

Accordingly, it is a primary object of the present invention to provide an improved method of assembling a print wheel comprised of a plurality of individual piece parts.

Another object of this invention is to provide an economical and effective method of assembling a print wheel comprised of a plurality of individual piece parts.

A further object of the present invention is to provide a novel method of assembling a print wheel comprised of a plurality of individual piece parts.

Other objects and advantages of the present invention will be evident from the specification and claims when read in conjunction with the accompanying drawing illustrative of the invention.

SUMMARY OF THE INVENTION

In accordance with the principles illustrative of this invention, the foregoing objects and others of the present invention are accomplished by providing a master wheel, which has been assembled using laboratory-type techniques and measurement equipment, wherein the character slugs are properly positioned and aligned with respect to the center axis of the wheel hub, about which the character slugs are rotated during a printing operation and the alignment notch in the hub which maintains the proper angular position of the character slugs with respect to a home position of the shaft of the print wheel motor. The individual component parts comprising the print wheel are (1) the metal insert with character slugs attached to radially extending beams, (2) the hub, (3) damper rings and (4) the cap.

A female mold is then cast of the likeness of the character printing surfaces of the character slugs of the master wheel with the hub being held in the mold-assembly fixture. The master wheel is then removed from the mold-assembly fixture. The female mold of the likeness of the character printing surfaces is used to hold the character slug of the subsequent metal insert and attached character slugs. The center of the hole in the metal insert and corresponding alignment shaft of the mold-assembly fixture is thereby referred to the character slugs. The hub and integral flag are placed in the mold assembly fixture and are automatically referenced correctly with respect to the character slugs by the alignment shaft. The hub is securely attached to the metal insert. The cap is attached to the hub, and the damper rings are attached to the beams of the metal insert. The print wheel was assembled by forming a female mold of the likeness of the character printing surfaces adapted to act as a clamp and reference point for the plurality of parts comprising a complete wheel and the parts are subsequently attached while clamped in alignment by the mold assembly fixture.

BRIEF DESCRIPTION OF THE DRAWING

Other advantages and features of the present invention may become more apparent from reading the following detailed description in connection with the drawing forming a part thereof, in which.

DETAILED DESCRIPTION

Figure 1:
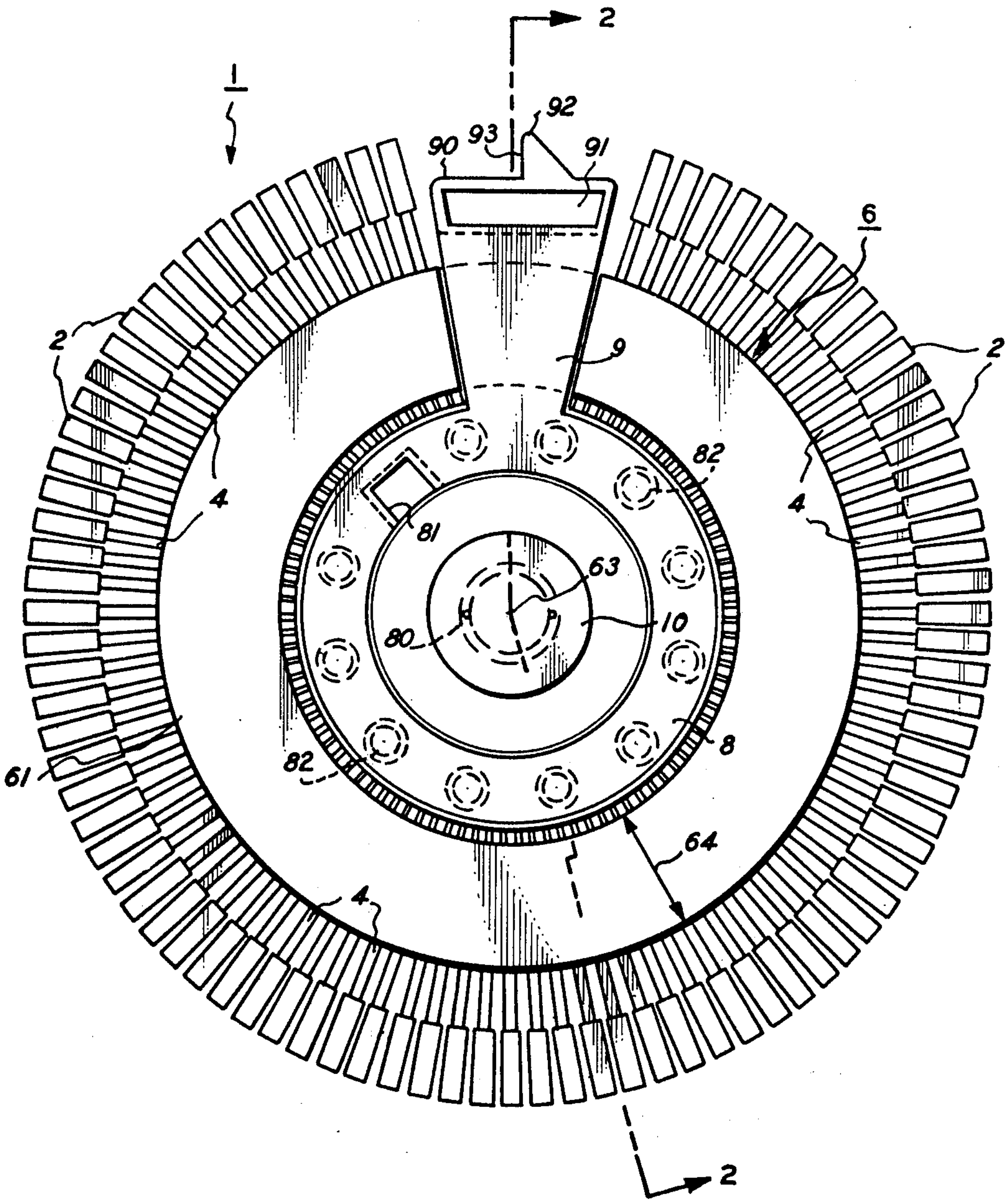
FIG. 1 is a plan view of a composite print wheel assembled according to the invention herein.
Figure 2:
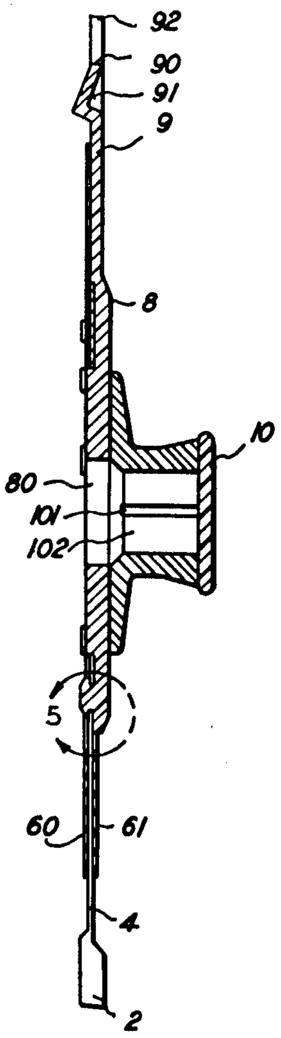
FIG. 2 is a sectional elevation view of the composite print wheel in FIG. 1 taken through lines 2—2.

Referring now to the drawing and more particularly to FIGS. 1 and 2, there is shown a composite print wheel assembled in accordance with the method of assembly as contemplated by the present invention. The print wheel 1 is a composite structure being made up of several components, the most prominent of which in FIG. 1 are the spokes or beams 4 with the character slugs 2 molded onto the ends thereof and the hub 8 riveted to the center of the wheel with its flag 9 extending outwardly amidst the beams. Other components include the damper 6 mounted over the beams to alter their deflection properties and a cap 10, for handling the print wheel 1, which resides at the core of the print wheel atop the hub 8.

Figure 3:
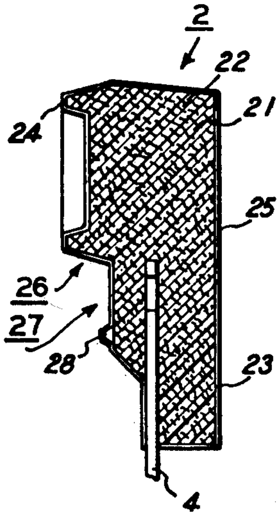
FIG. 3 is an enlarged side sectional view illustrating a typical character slug and beam tip structure.
Figure 4:
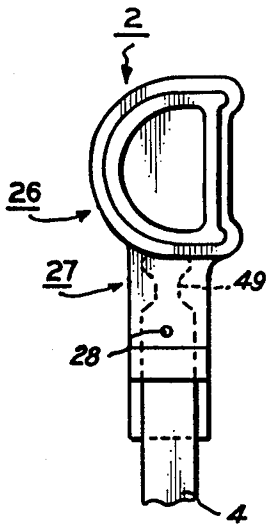
FIG. 4 is a plan view of a character slug with the tip of the beam, embedded inside the slug, shown in dashed lines.

Referring to FIGS. 3 and 4, the details of a character slug 2 are illustrated. The character "D" (capital *d*) is selected as typifying the structure of other character slug structures. For the present print wheel, there are 88 characters defining a particular font suitable for most English language document creation requirements. A 92-spoke wheel is used for some other language applications.

The character slugs 2 are molded onto the tips of the beams using a bulk 21 filled polymer 22 material and thereafter are plated by suitable processes with a metallic wear resistant coating 23. The mold, of course, shapes the entire character slug 2 including the printing surface 24 (in this case, the letter "D") and the impact surface 25. The printing surface 24 is the raised portion comprising the shape of the letter "D", which in a typewriter-like printer causes the ink from a ribbon to be transferred to paper in a corresponding letter "D" shape under the blow of a print hammer delivered to the character slug 2 on the impact surface 25.

The impact surface 25 is beyond or outwardly of the tip of the beam 4. This definition divides the character slug 2 into the two principle portions of the printing section 26 lying mostly under the letter "D" or other character and the capture section 27 surrounding the tip of a beam 4.

Each character slug 2 has a bench mark 28 for locating the character on the slug relative to a printing line. The character or the slug is precisely located relative to the bench mark since they are molded as an integral unit. It is desirable to precisely locate the bench mark relative to the center of the print wheel 1. The bench mark is located on the slug at a position on a shorter or equal radius to that for the lowest positioned character in the font—normally the "underline" character.

Another significant feature of the composite slug and beam structure of the instant print wheel 1 is that there are substantially no voids or severe discontinuities within the body of a character slug 2. Typically, in molding processes, a pin or other restraining device is used to hold a desired relation between an insert member, such as a beam 4 and the mold. The restraining pin results in the formation of a void or discontinuity within the body of the slug, which is detrimental to the life of the slug. These discontinuities are avoided in the molding of the character slugs 2 in the instant print wheel 1. The beams 4 are held at locations outside the mold cavity, and the tips of the beams are cantilevered inside the mold with the liquid plastic allowed to freely flow about and around the tip. All the character slugs 2 are molded onto the tips of the beams 4 in one step, they are ring gated from the outside. Keeping the tips of the beams 4 within the capture section 27 results in the tips not being subjected to untolerable bending forces when the liquid form of the plastic is introduced into the mold or during the curing of the plastic to a solid state. The character slug materials 21 and 22 in the preferred wheel are a fiberglass reinforced phenol-formaldehyde formulation available from Fiberite Corporation of Winova, Minnesota, and identified as FM 4011 melt flow 12–16 by spiral flow test.

The metallic wear-resistant coating 23 in the preferred wheel is a nickel alloy. The plating is done by a dipping process to an average thickness of about 0.001 inch with a mask used to cover the surface other than the character slugs 2. The outside surface of the character slugs is pretreated with a chromic acid to roughen the surface enhancing the adhesion of the nickel to the phenolic.

Figure 6:
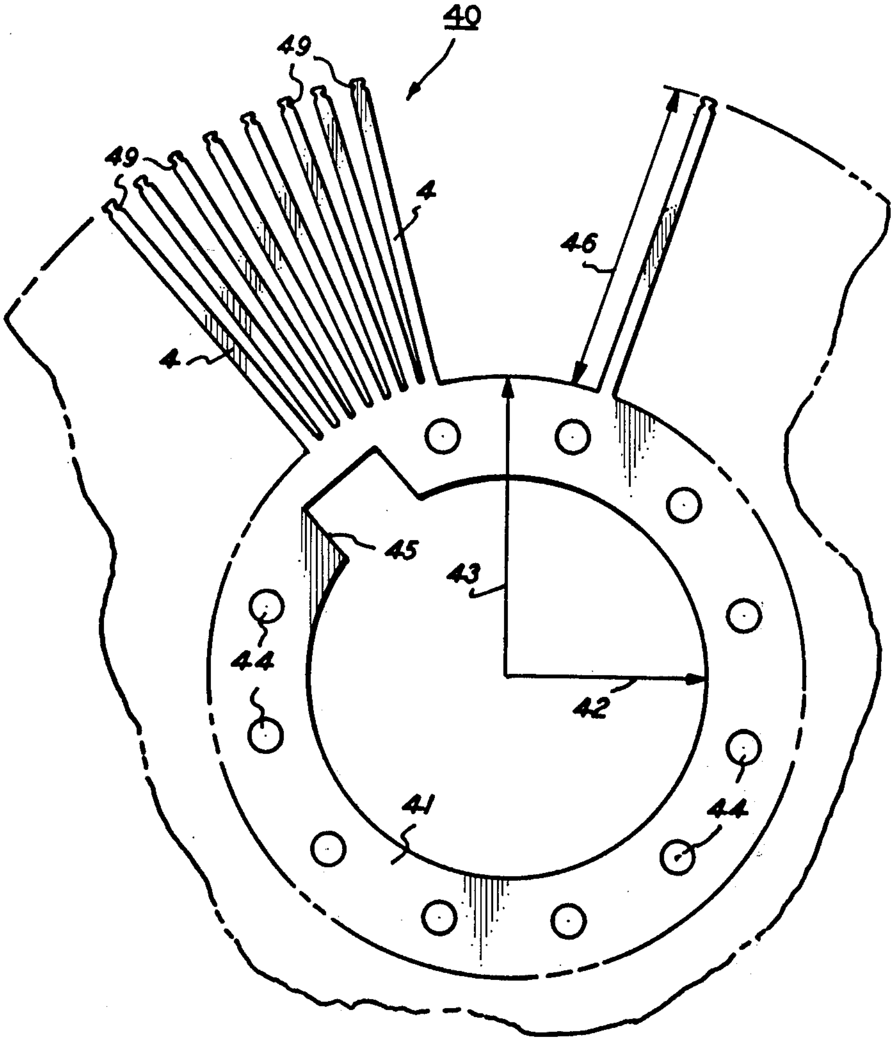
FIG. 6 is a partial plan view of the insert member used in the composite print wheel of FIG. 1.

Turning now to the beams 4, reference will be made to FIGS. 3, 4 and 6, with FIG. 6 showing the overall structure. The beams 4 are fabricated from a single piece of 0.006 inch thick cold reduced (Condition C) 17-7 PH stainless steel from ARMCO Steel Corporation, Middletown, Ohio, by chemical milling to yield an insert member 40, which has a circular center section on base 41, from which the beams 4 extend radially outwardly. The center portion of the base 41 is removed to reduce the weight and inertia of the overall print wheel 1. The width of the base 41 as defined by radii 42 and 43 is selected to provide structural integrity sufficient to maintain the cantilevered beams within a common plane and to enable the hub 8 to be coupled to the base 41 by means including the rivet or staking holes 44. The notch 45 is provided to permit an alignment key on the hub of the print wheel motor shaft to engage the print wheel 1.

At the tips or outer ends of the beams 4, a neck 49 is formed so as to create an anchor buried within the character slug 2. The shape of the neck 49 increases the radially directed force required to pull a slug from the end of a beam 4.

The hub 8 is shown in FIGS. 1, 2, 5 and 7. The hub 8 is a circular shaped piece with a hole 80 in the center to permit attachment of the print wheel 1 to a shaft on the print wheel motor for rotating the print wheel in a printing operation. The alignment of the print wheel 1 to the shaft and hub of the print wheel motor is provided by the keyway or notch 81. Relatively square notch 81 is precisely fabricated to maintain, after proper assembly of the component parts of the print wheel 1 (within desired tolerances), the angular position of the character slugs 2 and flag 9 with respect to the home position of the shaft of the print wheel motor. The hub 8 and integral flag 9 are preferably fabricated with and of a thermoplastic, such as phenol-formaldehyde resin, with eleven rivets 82 protruding outwardly and perpendicular to its body, in the molding process. The rivets 82 fit through the eleven holes 44 in the insert member 40. Ultrasonic staking (preferred method) of the rivets 82 creates the beads 83, which lock the hub 8 securely to the insert member 40. The detail of the rivet bead 83, insert member 40 and damper rings 60 and 61 is shown in the enlarged view at FIG. 5.

Figure 7:
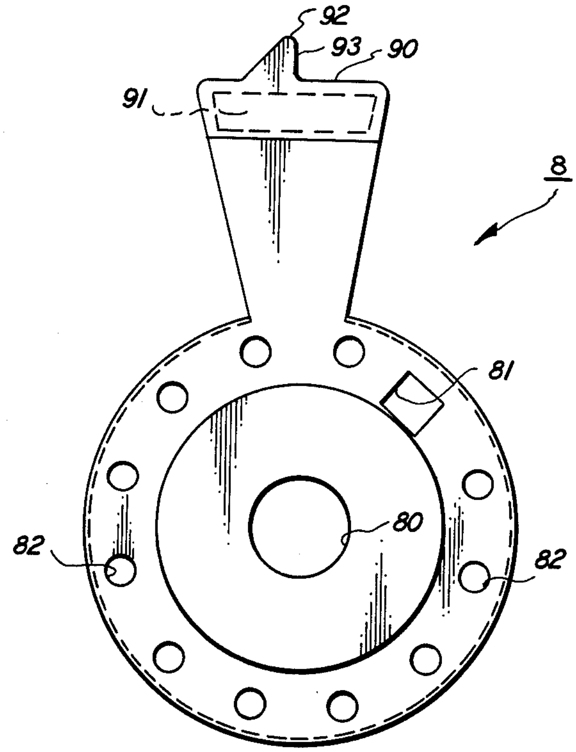
FIG. 7 is a plan view of the hub and integral flag used in the composite print wheel of FIG. 1.

The flag 9 is integral with hub 8, being fabricated with the hub as a unit in the injection molding process. FIGS. 1, 2 and 7 show the flag 9. The flag 9 is a truncated pie-shape element whose width increases with radii, unlike beams 4 which have a fixed width over their length. The outer end of the flag 9 includes a straight edge 90, which underlines the line of characters being printed. The sloped surface 91 facing the operator visually emphasizes the straight edge 90 and minimizes the reflection of light to the eyes of the operator.

At the very end of the flag 9 is the pointer 92. The pointer 92 is a vertical reference mark to help the operator to visually align the eye to the printing position. The vertical surface 93 and straight edge 90 form a "cross-hair" for locating characters in a line of print.

Figure 8:
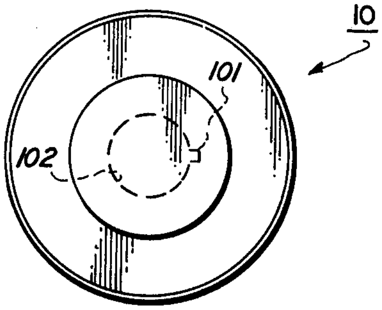
FIG. 8 is a plan view of the cap used in the composite print wheel of FIG. 1.

The cap 10, as shown in FIGS. 1, 2 and 8, is the handle for the print wheel 1 as well as a means to help attach the wheel to the shaft of the print wheel motor in a printer. The cap 10 is fabricated from a suitable plastic material, such as styrene-butadiene copolymer. The cap 10 is preferably fastened to the hub 8 on the printing side of the print wheel 1 by a suitable adhesive. The insertion and withdrawal of the print wheel 1 from the shaft of the print wheel motor is envisioned as a manual operator task with the print wheel 1 being handled during those operations by means of cap 10. A slot or keyway 101 is cut into the inside surface of the cylindrical cavity 102 within the cap. This slot 101 allows air to escape during installation of the print wheel onto the shaft of the print wheel motor.

Figure 5:
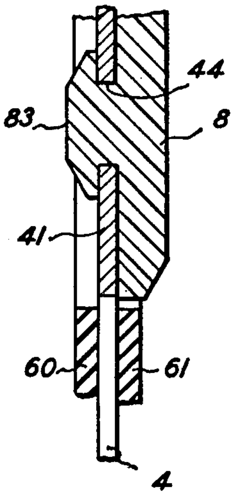
FIG. 5 is an enlarged view of the region of FIG. 2 surrounded by the circular arrow 5.

The damper 6 is shown in FIGS. 1, 2 and 5. The damper 6 comprises two circular rings 60 and 61 with ring 61 seen in FIG. 1 located on the printing side of the print wheel 1 and ring 60 located on the impact side of the print wheel. The rings are made from a Buna N coated nylon fabric 0.006 inch thick available from E. I. Du Pont de Nemours & Company of Wilmington, Del., under the number BN-5027. Rings 60 and 61 are aligned concentric with the axis 63 of rotation of the print wheel 1, which axis 63 is normal to the plane of the drawing shown in FIG. 1. The rings 60 and 61 are preferably adhesively bonded to the beams 4 and to each other in the regions between the beams. The width 64 of the rings 60 and 61 is selected to that they are coupled only to the beams 4 and not the bub 8 or the character slugs 2. Ring 61 has a section cut away in the region of the flag 9 whereas ring 60 is a full circular surface. Functionally, the rings 60 and 61 alter the deflection properties of the beams 4 by reducing the vibration amplitude and duration of the beams 4 for a given deflection of a beam tip from the common plane shared by the beams.

In review, the components required to be assembled to form the composite structure print wheel 1 are (a) the insert member 40 with the character slugs 2 already molded onto the tips of the beams 4 and with the character slugs already dipped and provided with the metallic coating 23, (b) the one-piece injection molded hub 8 and integral flag 9, (c) cap 10 and (d) damper rings 60 and 61.

The first two components, which are required to be assembled together with a great degree of accuracy, are the hub 8 and integral flag with the insert member 40 and attached character slugs 2. The means by which these two components are fastened together are the eleven rivets 82 protruding from the hub 8 and the corresponding eleven holes 44 in the insert member 40. As previously noted supra, it was not possible to control the tolerances of the mating individual parts (the eleven rivets 82 and the eleven holes 44) such that they could be forced or fitted together and permanently fastened with the resulting print wheel 1 having the vertical and horizontal registration of the characters with respect to the hole 80 in the center of the hub 8 and the keyway or notch 81 in the hub within the required specification value for acceptable print quality. In addition to the problem of the tolerances with regard to the eleven rivets 82 and the eleven holes 44, there was the additional problem of tolerance on the mold registration (front half of the mold to the back half of the mold) when the character slugs 2 were molded to the tips of the beams 4. Also involved is the tolerance on the metal insert member 40 and extending beams 4 and their position fit in the mold die for the molding of the character slugs 2 onto the tips of the beams 4. With all the above mentioned tolerances involved, it was not possible to hold each part in an assembly fixture in the known and conventional manner and obtain an assembled print wheel 1, which would meet the vertical and horizontal registration specifications set forth for the characters.

In order to check the assembled print wheels 1 for the amount the characters and the print wheel 1 deviated from the specification value for the vertical and horizontal registration measurements, a print wheel inspection fixture was fabricated. It is a laboratory-type test instrument with micrometer-type adjustments for indicating the values of the measurements as taken by using very accurate optical means. The insert member 40 (with character slugs 2 attached to the beams 4) is fastened to the hub 8 and integral flag 9 and the unit is fastened to the mounting means of the inspection fixture, which references to the hole 80 and notch 81 in the hub 8. The unit is rotated one character slug at a time, and the operator of the inspection fixture looks through the eyepiece of the inspection fixture at the bench mark 28 for each character slug 2 and measures the location of each bench mark 28 (a polar plot) with reference to the center of hole 80 and notch 81 in the hub 8 to obtain the vertical and horizontal registration of the characters/character slugs 2 around the print wheel.

Up to the time of the present invention, in order to obtain print wheels 1, which satisfied the specification values of vertical and horizontal registration measurements, the insert member 40 (with character slugs 2 attached to the beams 4) was removably fastened by adhesive means (the rivets 82 were not staked) to the hub 8 and the unit was fastened to the inspection fixture and the polar plot was made to determine the vertical and horizontal registration of the character printing surface/character slugs 2 around the print wheel. The polar plot would indicate the general direction and amount of relative movement needed between the insert member 40 and the hub 8 to obtain vertical and horizontal registration values within the specification values. After a certain amount of trial and error (up to two hours) the insert member 40 and the hub 8 would be located at a position relative to each other, which would result in acceptable vertical and horizontal registration values. The insert member 40 and hub 8 would be placed in the ultrasonic staking fixture and the rivets 82 would be ultrasonically staked resulting in the rivet beads 83, which lock the hub 8 securely to the insert member 40. The cap 10 and damper rings 60 and 61 would then be assembled to the previously assembled insert member 40 and hub 8. This amount of time and effort made the cost of the print wheel 1 prohibitive for commercial success even though the print quality was more than acceptable.

Then the present invention was conceived, the concept being that of assembling a composite print wheel by providing registration of the individual parts by restraining the character printing surface/character slugs 2. The idea is to let all the parts initially float except those, which are trying to maintain at certain positions—the character printing surface/character slugs 2. Clearance is provided throughout the individual parts so that the hub/flag is staked to the insert member 40 only after proper registration between the hub 8 and the character printing surface/character slugs 2.

Figure 9:
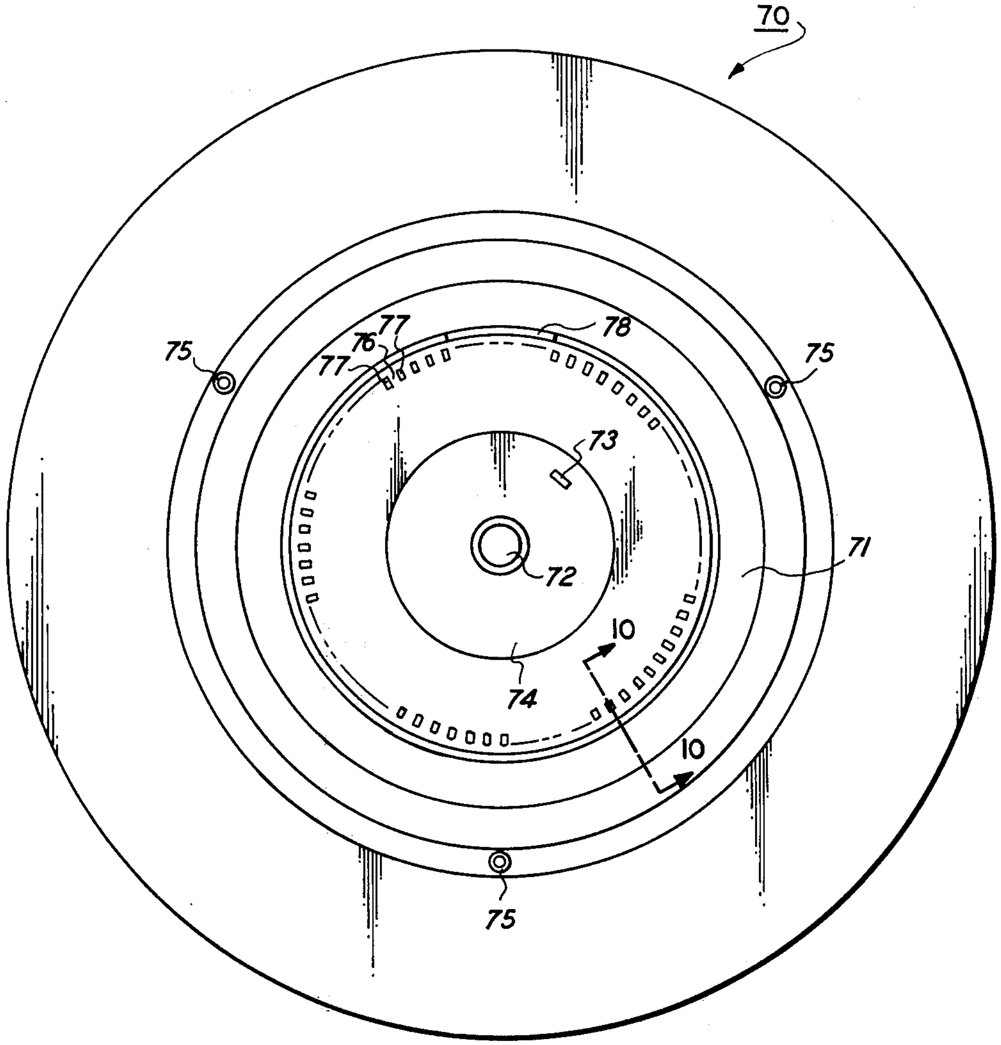
FIG. 9 is a plan view of the mold and assembly device utilized in the assembly of a composite print wheel according to the invention herein.
Figure 10:
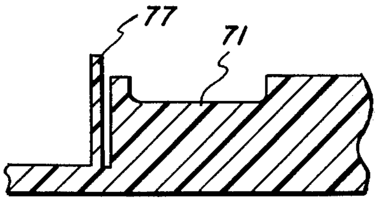
FIG. 10 is an enlarged side sectional view of the region of FIG. 9 surrounded by the circular arrow 10.

The method by which the character printing surface/character slugs 2 are restrained is to cast a likeness (a female mold) of the character printing surface/character slugs 2 into a material in a mold-assembly fixture 70 similar to that shown in FIG. 9. The mold material will cure to a desired hardness and subsequent insert members 40 with attached character printing surface/character slugs will be held in alignment by the female mold of the likeness of the character printing surface/character slugs 2 while the hub 8 staked thereto, and the cap 10 and damper rings 60 and 61 are adhesively attached.

The first step is to provide a "master wheel" of a particular font by removably fastening by adhesive means the insert member 40 (with character slugs 2, with the desired character fonts thereon, attached to the beams 4) to the hub 8. Fasten the unit to the inspection fixture, make the polar plot and move the hub 8 and insert member 40 (relative to each other), repeat the polar plot, move the hub, etc., until by trial and error the hub 8 and insert member 40 are positioned such that the horizontal and vertical registration values of the character printing surface/character slugs 2 are within the specification values.

Then mold material, preferably an epoxy material, such as Dexter's All Purpose Clear Polyester Casting Resin, Catalog No. 29-20007, by Lee Wards, Elgin, Ill., is flowed into mold cavity 71 of FIG. 9 to a predetermined depth. The aligned and removably fastened hub 8 and insert member 40, with character printing surface/character slugs 2 attached, is placed into the mold-assembly fixture 70 with shaft 72 aligned with hole 80 of hub 8 and post 73 aligned with notch 81 of hub 8. Flag 9 extends through notch 78. Hub 8 rests against platform 74 with beams 4 aligned in grooves 76 formed between posts 77. The character printing surfaces 24 are pressed down lightly and held down in the predetermined depth of mold material such that the shape of the printing surface of the characters (a female mold) is formed in the mold material. The character printing surfaces 24 are held down, along with the beams 4 being held steady, by a mold cover (not shown), which rests on the top of the mold-assembly fixture 70. The mold cover top is held in alignment by pins 75, which cooperate with mating holes in the mold cover. Preferably, the portions of the mold cover, which contact beams 4 and impact surface 25 of the character slugs 2 are covered with foam material to damp out any vibratory movement in the unit. After the mold material (epoxy) cures, the mold cover is removed and the hub 8 and insert member 40, with attached character slugs 2, are removed and the likeness of the printing surfaces 24 (the female mold) is left in the mold material in mold cavity 71. The predetermined depth of mold material in mold cavity 71 is of such a depth that the character slug 2 is not encapsulated so the character slug 2 cannot be removed after the mold material cures; the depth of the mold material is such that the likeness of the printing surfaces 24 are molded and the character slugs 2 can be easily removed after the mold material cures. Now the likeness of the printing surfaces 24 of the character slugs 2 is referenced to shaft 72 and post 73.

Now the mold-assembly fixture 70 is ready to assemble composite print wheels 1 of the same font style as that of the female mold in mold cavity 71. First a hub 8 and integral flag 9 are placed in fixture 70 with rivets 82 facing upward away from the mold and hole 80 of hub 8 aligned with shaft 72 and notch 81 aligned with post 73. Then an insert member 40 with attached character slugs 2 is placed in the fixture 70 with the printing surfaces 24 of the character slugs 2 aligned with and fitted into their molded likeness in the mold material in mold cavity 71. Now the insert member 40 and hub 8 are aligned and in registration. The mold cover is placed on fixture 70, the ultrasonic staking fixture is placed on the rivets 82, and the rivets 82 are staked creating the beads 83, which lock the hub 8 securely to the insert member 40, still in correct alignment and registration with each other.

Damper rings 60 and 61 are then adhesively fastened to the appropriate sides of beams 4. This is preferably completed in a separate fixture, which holds one ring in each of the top and bottom portions of the fixture. The print wheel 1 is placed in the fixture, and the top and bottom of the fixture are pressed on either side of the print wheel resulting in the adhesive portions of the damper rings to be attached to either side of beams 4.

The cap 10 is then fastened to hub 8, preferably adhesively. The print wheel 1 is placed over a pilot shaft in another fixture in proper orientation such that the cap is pressed downwardly toward the hub 8 and over the pilot shaft and is adhesively fastened to hub 8. With that final step, a composite print wheel is assembled with the piece parts in correct alignment and registration.

A master wheel and corresponding mold-assembly fixture is required for each particular font for which wheels are to be assembled.

Although the assembly method as contemplated by the present invention has been described with reference to preferred arrangements, it will be generally understood by those skilled in the art that various changes may be made and equivalents may be substituted without departing from the true spirit and scope of the invention as defined in the appended claims.

What is claimed is:

1. A method of assembling a composite print wheel comprising the steps of:

locating a hub member in an assembly fixture in a fixed predetermined position, locating an insert member, with character slugs attached to outer ends of beams, in the assembly fixture in a fixed predetermined position such that print characters on the character slugs align with and fit into a respective molded likeness of a corresponding print character provided in the assembly fixture; and fastening the hub member and the insert member together.

2. The method of assembling the composite print wheel of claim 1 including the prior steps of:

taking a master wheel containing a font of print characters located on character slugs positioned annularly about a central insert member which is fastened to a hub member, said hub member containing a rotation point of reference; and molding a likeness of the print characters of the master wheel, referenced to the rotation point on the hub of the master wheel, to provide a female mold of the likeness of the print characters in the assembly fixture.

3. The method of assembling the composite print wheel of claim 1 further including the step of fastening at least one damper ring member to beams of the insert member.

4. The method of assembling the composite print wheel of claim 1 further including the step of fastening a cap member to said hub member.

5. The method of assembling the composite print wheel of claim 1 wherein said hub member and said insert member are fastened together by ultrasonic staking.

6. The method of assembling the composite print wheel of claim 5 further including the step of supporting the beams and character slugs against foam material during the ultrasonic staking step.

* * * * *